Patented May 5, 1925.

1,536,098

UNITED STATES PATENT OFFICE.

HENRY G. JAEGER, OF ROSE HILL, CALIFORNIA, ASSIGNOR OF ONE-FOURTH TO EVERETT R. LAMBERTSON AND ONE-FOURTH TO GEORGE P. CLEMENTS, BOTH OF EAGLE ROCK CITY, CALIFORNIA, AND ONE-FOURTH TO JULIUS SCHNEIDER, OF LOS ANGELES, CALIFORNIA.

PROCESS OF PREPARING PLASTIC COMPOSITION SUITABLE FOR FIBER FLOORING.

No Drawing.   Application filed October 4, 1922.   Serial No. 592,418.

*To all whom it may concern:*

Be it known that I, HENRY GEORGE JAEGER, a citizen of the United States, residing at Rose Hill, in the county of Los Angeles and State of California, have invented new and useful Improvements in a Process of Preparing Plastic Composition Suitable for Fiber Flooring, of which the following is a specification.

My present invention relates to a process of preparing composition for use in the production of flooring or the like, one object of the present invention being the production of a flooring which can be economically prepared and laid, and which shall be superior in point of durability and resiliency, my composition being also suitable for use in the production of a wainscoting or of furniture parts or of kitchen sinks, drain boards, ornamental moldings, and similar decorative or structural products.

Another object of my invention is the production of products of the character referred to which shall be resistant not only to wear but to exposure to the weather or to soap and water or other cleansing agents and which shall also be practically incombustible and little affected by heat or cold. Other objects of my invention are the production of a product of the general character referred to which can be worked with ordinary wood working tools and which shall not be liable to warp or crack, which shall be susceptible of a high polish, but nevertheless capable of yielding slightly in such manner as to be comparatively noiseless when used under foot, it being possible to gain also an insulating effect and a soundproofing effect by the use of my composition over a scratch coat when the same is applied to a floor. Other objects of my invention will appear from the detailed description which follows and from the appended claim, and it will be understood by those skilled in the art that certain features of my invention may be independently used and also that various modifications may be made in its details without departing from the spirit of my invention as herein indicated.

In the practice of my invention, I prefer to take, for example, one pound of a strong fiber, such as hemp fiber, and to saturate the same with a 22° Bé. solution of magnesium chloride, allowing all excess to drip off thoroughly, and to mix therewith nine pounds of a mixture containing three pounds of finely powdered silica passing two hundred meshes to the inch, and six pounds of finely powdered calcined magnesite. After the above has been thoroughly mixed, I add thereto sufficient of a 22° Bé. solution of magnesium chloride to form a plastic mass of putty-like consistency.

The plastic mass prepared as above may then be placed in forms, or it may be spread upon a floor, or it may be spread upon a smooth surface, such as that of plate glass. In the latter case, after the material has been permitted to become thoroughly dry the surface which has been next the glass will be found to have acquired a very perfect polish. In the other cases, a polish may be imparted by the use of a buffer.

When the material is applied to a floor, any suitable scratch coat may be first applied, and it is advantageous that this scratch coat shall be relatively porous, in order that it may have a slightly yielding character, and in order that openings therein may contribute to insulation against heat or cold, a flooring produced as above being exceptionally "warm," fireproof, non-warping and durable. One composition especially suitable for use as a scratch coat in the practice of this invention is fully set forth in my co-pending application Serial No. 592,422, filed October 4, 1922, but it will be obvious that equivalent materials may be employed. Any desired lime-proof coloring matter may be added to the mixture as above described, and, by known means, imitation marble effects may be imparted thereto. Under ordinary weather conditions about eight hours will suffice for the hardening of a floor prepared as above described, and when the material is spread upon glass or the like, as I prefer to do in the preparation of units such as tile, suitable for use either upon floors, walls or ceilings, the layer of relatively porous material must obviously be applied as a backing, rather than as a preliminary or scratch coat. After the tile-like units are removed from the surface of glass, or its equivalent, the smooth surface of the respective units may be given a greater permanence, if desired, and the surface of the floor prepared in situ may also be protected after a polish has been imparted thereto, by the addition of a coat or coatings which may comprise a hard drying varnish, one especially suitable treatment for this purpose being described and claimed in my co-pending application Serial No. 592,419, filed October 4, 1922.

I claim as my invention:

In the production of a surface, preparing a fibrous material by saturating it with a solution of magnesium chloride, allowing the material to drain, separately mixing powdered silica and powdered calcined magnesite, mixing this powdery mixture with the fiber prepared as above, adding sufficient of a solution of magnesium chloride to form a plastic mass, spreading the composition so prepared upon a material such as glass, adding a relatively porous backing composition thereto, then permitting the product to dry, then stripping the product from the surface of the glass, and finally applying a protecting coat to the surface which had been in contact with the glass.

In testimony whereof I have signed my name to this specification.

H. G. JAEGER.